(12) United States Patent
Birkheim

(10) Patent No.: US 11,338,840 B2
(45) Date of Patent: May 24, 2022

(54) CLAMPING DEVICE FOR A STEERING COLUMN AND ADJUSTING DEVICE FOR A STEERING COLUMN

(71) Applicant: ZF Automotive Germany GmbH, Alfdorf (DE)

(72) Inventor: Andreas Birkheim, Cologne (DE)

(73) Assignee: ZF Automotive Germany GmbH, Alfdorf (DE)

( * ) Notice: Subject to any disclaimer, the term of this patent is extended or adjusted under 35 U.S.C. 154(b) by 41 days.

(21) Appl. No.: 16/812,267

(22) Filed: Mar. 7, 2020

(65) Prior Publication Data
US 2021/0276607 A1    Sep. 9, 2021

(30) Foreign Application Priority Data
Mar. 6, 2019   (DE) .......................... 102019105696.9

(51) Int. Cl.
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC ......... B62D 1/184; B62D 1/185; B62D 1/187
See application file for complete search history.

(56) References Cited

U.S. PATENT DOCUMENTS

| | | | | |
|---|---|---|---|---|
| 5,117,707 A | * | 6/1992 | Kinoshita | B62D 1/184 280/775 |
| 5,570,610 A | * | 11/1996 | Cymbal | B62D 1/184 74/493 |
| 5,687,990 A | * | 11/1997 | Uphaus | B62D 1/184 280/775 |
| 5,921,577 A | * | 7/1999 | Weiss | B62D 1/184 280/775 |
| 7,010,996 B2 | * | 3/2006 | Schick | B62D 1/184 280/775 |
| 7,415,908 B2 | * | 8/2008 | Zernickel | B62D 1/184 280/775 |
| 7,861,615 B2 | * | 1/2011 | Harris | B62D 1/184 74/493 |
| 8,590,932 B2 | * | 11/2013 | Dietz | B60R 21/09 280/775 |
| 8,991,863 B2 | * | 3/2015 | Hahn | B62D 1/184 280/775 |
| 9,032,835 B2 | * | 5/2015 | Davies | B62D 1/184 74/493 |

(Continued)

FOREIGN PATENT DOCUMENTS

DE   112015001863 T5   1/2017
JP   2018127041 A   *  8/2018

*Primary Examiner* — Laura Freedman
(74) *Attorney, Agent, or Firm* — Robert James Harwood

(57) ABSTRACT

A clamping device for a longitudinally adjustable and/or vertically adjustable steering column of a vehicle, has an actuating lever, an actuating component, a tie bolt and a mating component, wherein the actuating component is assigned to the actuating lever, and the mating component is assigned to the tie bolt, and wherein the actuating component is movable relative to the mating component between a release position and a fixing position. A solid damping element is provided for damping a relative movement between the actuating component and the mating component. An adjusting device is furthermore shown.

20 Claims, 4 Drawing Sheets

(56) References Cited

U.S. PATENT DOCUMENTS

| | | | | |
|---|---|---|---|---|
| 9,150,240 B2* | 10/2015 | Schnitzer | ............... | F16F 7/06 |
| 9,290,197 B2* | 3/2016 | Kern | ............... | B62D 1/184 |
| 9,522,693 B2* | 12/2016 | Tomaru | ............... | B62D 1/187 |
| 9,932,061 B2* | 4/2018 | Butler | ............... | B62D 1/187 |
| 10,137,923 B2* | 11/2018 | Sikotra | ............... | B62D 1/187 |
| 10,913,483 B2* | 2/2021 | Huber | ............... | B62D 1/195 |
| 2005/0047701 A1* | 3/2005 | Schick | ............... | F16C 33/543 |
| | | | | 384/623 |
| 2006/0273567 A1* | 12/2006 | Fix | ............... | B62D 1/184 |
| | | | | 280/775 |
| 2015/0360712 A1* | 12/2015 | Baumeister | ............... | B62D 1/19 |
| | | | | 403/53 |
| 2017/0072987 A1* | 3/2017 | Dasadi | ............... | B62D 1/184 |
| 2020/0339177 A1* | 10/2020 | Thebault | ............... | B62D 1/195 |
| 2020/0406951 A1* | 12/2020 | Lingemann | ............... | B62D 1/187 |
| 2021/0024128 A1* | 1/2021 | Schutz | ............... | B62D 1/11 |
| 2021/0129889 A1* | 5/2021 | Bodtker | ............... | B62D 1/184 |

* cited by examiner

CLAMPING DEVICE FOR A STEERING COLUMN AND ADJUSTING DEVICE FOR A STEERING COLUMN

CROSS-REFERENCE TO RELATED APPLICATION

This application claims priority to German Patent Application No. 102019105696.9, filed Mar. 6, 2019, the disclosure of which is incorporated herein by reference in its entirety.

TECHNICAL FIELD

The invention relates to a clamping device for a longitudinally adjustable and/or vertically adjustable steering column of a vehicle and to an adjusting device for longitudinal and/or vertical adjustment of a steering column of a vehicle.

BACKGROUND

The invention relates to a clamping device for a longitudinally adjustable and/or vertically adjustable steering column of a vehicle and to an adjusting device for longitudinal and/or vertical adjustment of a steering column of a vehicle.

Vertically and/or longitudinally adjustable steering columns are very well known in motor vehicle construction. To adjust the steering column, the driver must generally use an actuating lever to release a clamping device, which then releases the steering column for adjustment. In such adjusting devices or clamping devices, an actuating component is rotated relative to a mating component in order to release clamping jaws. However, the preload on the clamping jaws may result in accelerated movement of the actuating lever, which if actuated carelessly, ultimately makes abrupt stop contact and comes to a haft. Unwanted noises arise during this process. A clamping device of this kind is known from US 2003/0221505 A1, for example.

In order to suppress noise, there are known solutions in which the actuating component and the mating component are damped by means of a highly viscous fluid. However, this proves to be complex when implemented.

SUMMARY

The invention relates to a clamping device for a longitudinally adjustable and/or vertically adjustable steering column of a vehicle and to an adjusting device for longitudinal and/or vertical adjustment of a steering column of a vehicle.

Vertically and/or longitudinally adjustable steering columns are very well known in motor vehicle construction. To adjust the steering column, the driver must generally use an actuating lever to release a clamping device It is therefore the object of the invention to provide an adjusting device for a steering column and a clamping device for a steering column which efficiently prevent noise generation.

The object is achieved by a clamping device for a longitudinally adjustable and/or vertically adjustable steering column of a vehicle, having an actuating lever, an actuating component, a tie bolt and a mating component. The actuating component is assigned to the actuating lever, and the mating component is assigned to the tie bolt, and the actuating component is movable relative to the mating component between a release position and a fixing position. A solid damping element is provided for damping a relative movement between the actuating component and the mating component. Here, the solid damping element is composed of a solid material, i.e., it is not composed of a liquid or highly viscous material. It is composed of rubber, for example. Both the actuating component, the mating component and/or the actuating lever each have a through opening, for example, which are in alignment with one another and through which the tie bolt extends.

By virtue of the solid damping element, the clamping device or the adjusting device can be assembled simply and cleanly while, at the same time, the relative movement between the actuating component and the mating component can be reliably damped. This makes the relative movement slower at the end and during the entire scope of movement, and therefore there is no abrupt stop contact and thus no unwanted noise generation.

For example, the actuating component is secured on the actuating lever for conjoint rotation therewith, in particular being formed integrally with the actuating lever, wherein the actuating component and the actuating lever are rotatable about an axis of rotation relative to the mating component and/or the tie bolt. As a result, a simple relative rotation is possible between the actuating component and the mating component.

In this case, the axis of rotation is preferably the longitudinal axis of the tie bolt. Moreover, the mating component is secured for conjoint rotation with respect to the tie bolt, in particular directly on the tie bolt, for example. The actuating component and the mating component together form a locking subassembly. The axial length of the locking subassembly can be changed by rotating the actuating component relative to the mating component, for example.

In one embodiment of the invention, the damping element is integral, thereby making it possible to reduce the number of components. In one embodiment of the invention, the damping element is secured on the actuating lever and/or on the actuating component and is in contact with the mating component. It is thereby possible to damp the relative movement efficiently.

As an alternative or in addition, the damping element is secured on the mating component and is in contact with the actuating lever and/or with the actuating component, thereby making it possible to damp the relative movement starting from the mating component. The mating component and/or the actuating component can have an annular outer contour, which is concentric with the tie bolt, thereby simplifying rotation. In order to ensure reliable damping and rotation, the actuating lever or the actuating component has a hollow-cylindrical extension having an inner wall, in which extension the mating component is at least partially accommodated, in particular wherein the damping element is secured on the inner wall.

The damping element is arranged on the inner wall in the region of the mating component, for example, especially if the clamping device is in the release position. In this case, the damping component can be in contact with the mating component at the outer contour of the mating component. For example, the damping element extends completely around the actuating component or the mating component. The extension can be a circular cylinder. It is also conceivable for the actuating component to be accommodated in the cylindrical extension.

In one embodiment of the invention, the actuating component or the mating component has at least one damping surface, on which the damping element is secured, and the mating component or the actuating component has at least one contact surface, with which the damping element is in contact. In this way, damping of the relative movement can take place directly between the actuating component and the mating component. In this case, the damping surface and/or the contact surface can be arranged substantially perpendicularly to the axis of rotation.

In one embodiment of the invention, the actuating component and the mating component each have at least one ramp section, which sections are formed in a manner complementary to one another, in particular wherein the actuating component and the mating component each have at least two bearing surfaces on their facing ends, wherein the ramp sections are provided between the bearing surfaces. It is thereby possible to apply the desired force along the tie bolt by means of a simple geometric design. The ramp sections can lie between two of the damping surfaces or two of the contact surfaces.

For example, the ramp elements interact in such a way during a relative rotation of the actuating component and of the mating component about the axis of rotation that the actuating component moves in the axial direction relative to the mating component, thereby enabling clamping jaws to be actuated. For example, the ramp elements rest against one another in the release position, and/or the actuating component and the mating component engage in one another. In the fixing position, the actuating component and the mating component can rest against one another by means of their ends.

In order to allow freedom in the design of the damping element, the damping element can be a separate insert, in particular an O-ring, or the damping element is molded onto the actuating lever, onto the actuating component and/or onto the mating component.

For example, the damping element is composed of a flexible material, in particular of rubber or a thermoplastic elastomer, or the damping element is composed of a hard material, in particular a polymer or a metal. A good damping effect is ensured by these materials. The flexible material is preloaded, for example. When using a hard material, a suitable fit is chosen, in particular.

In one variant embodiment, the damping element is formed integrally with the actuating lever, the actuating component and/or the mating component, in particular as a projection. The number of components of the clamping device is thereby further reduced.

In another embodiment of the invention, the clamping device has a spring element, which preloads the mating component against the actuating component. This ensures that the mating component and the actuating component are always in contact. For example, the clamping device has at least one, in particular two clamping jaws, which are actuated by means of the tie bolt, thereby enabling the steering column to be fixed or released reliably.

The object is furthermore achieved by an adjusting device for longitudinal and/or vertical adjustment of a steering column of a vehicle, having a longitudinally adjustable and/or vertically adjustable steering column and a clamping device according to the invention for the steering column, wherein the steering column is longitudinally adjustable and/or vertically adjustable in the release position and is neither longitudinally adjustable nor vertically adjustable in the fixing position. In this case, the clamping jaws can fix the steering column in the fixing position.

SUMMARY

Further features and advantages of the invention will emerge from the following description and from the attached drawings, to which reference is made. In the drawings.

DETAILED DESCRIPTION

Figure 1:
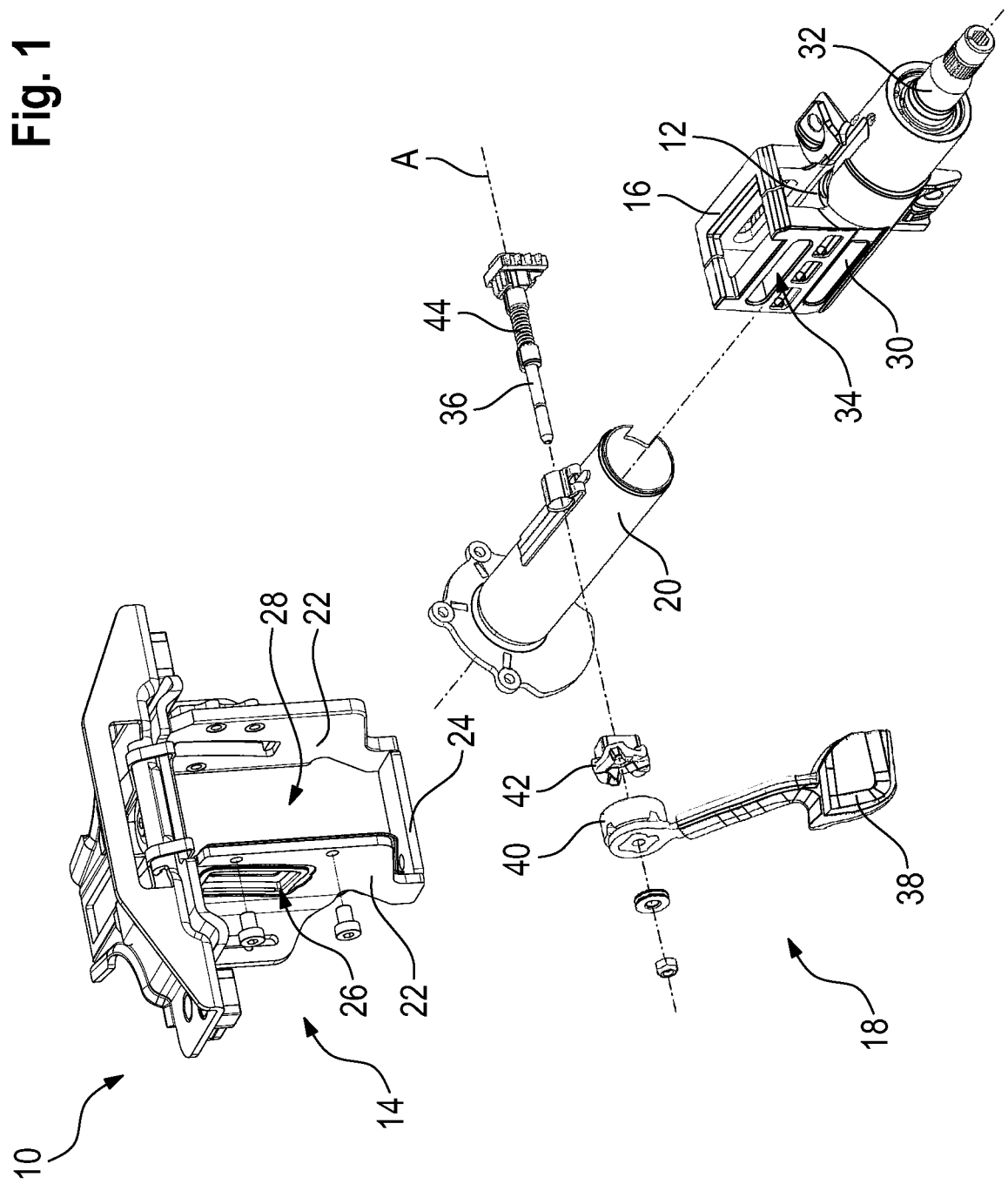
FIG. 1 shows an adjusting device according to the invention in an exploded view.

An adjusting device 10 for longitudinal and/or vertical adjustment of a steering column 12 of a vehicle (not shown), in particular a passenger vehicle, is illustrated in FIG. 1. The adjusting device 10 has a steering column clamping support 14, a steering column housing 16, a clamping device 18 and a telescopic tube 20. The steering column clamping support 14 or clamping device 18 has two clamping jaws 22 situated opposite one another, in particular mirror-symmetrical clamping jaws, and an optional connecting web 24, by means of which the clamping jaws 22 are connected to one another. The clamping jaws 22 are fixed on the vehicle and can flex relative to the connecting web 24. The clamping jaws 22 each have a slot 26, wherein the slots 26 are in alignment with one another. Formed between the two clamping jaws 22 is a channel 28, which is bounded laterally by the clamping jaws 22 and the optional connecting web 24. The steering column housing 16 can be inserted into the channel 28.

The steering column housing 16 has a cuboidal section 30, in which the telescopic tube 20 is at least partially accommodated, wherein the steering shaft 32 extends through the telescopic tube 20 and thus through the cuboidal section 30. Provided in the cuboidal section 30 is a longitudinal slot 34, the longitudinal axis of which extends substantially perpendicularly to the longitudinal axis of the slots 26 in the clamping jaws 22 and is in partial alignment with the slots 26.

In the mounted state, the telescopic tube 20 is inserted in the steering column housing 16, wherein the steering column housing 16 is arranged in the channel 28. The clamping device 18 has a tie bolt 36, an actuating lever 38, an actuating component 40, a mating component 42 and a spring element 44. The spring element 44 can be formed by the clamping jaws 22 and/or can be formed directly on the tie bolt 36, e.g. as a spiral spring. In the assembled state of the adjusting device 10, the tie bolt 36 of the clamping device 18 extends both through the slots 26 in the clamping jaws 22 and through the longitudinal slots 34 in the steering column housing 16. The clamping jaws 22 can thus be actuated by the tie bolt 36. Moreover, the tie bolt 36 also extends through the actuating lever 38, the actuating component 40 and the mating component 42, which have corresponding through openings for the tie bolt 36.

In this case, the actuating component 40 and the mating component 42 are preloaded against one another by virtue of the spring element 44. The tie bolt 36 thus defines an axis of rotation A for a rotary motion of the actuating component 40 and of the mating component 42 relative to one another. The actuating component and the mating component 42 are arranged concentrically with one another and with the axis of rotation A and can be regarded as a locking subassembly.

By means of the clamping device 18, the steering column 12 can be fixed in a position. For this purpose, the actuating lever 38 is actuated, whereby the clamping jaws 22 are pressed against one another along the tie bolt 36 by the actuating component 40 and the mating component 42. The clamping device 18 is then situated in a fixing position. If the actuating lever 38 is actuated in the other direction again, the clamping jaws 22 are released from the steering column housing 16, and the steering column 12 can then be adjusted in the longitudinal and transverse directions thereof. The clamping device 18 is then in its release position.

Figure 2A:
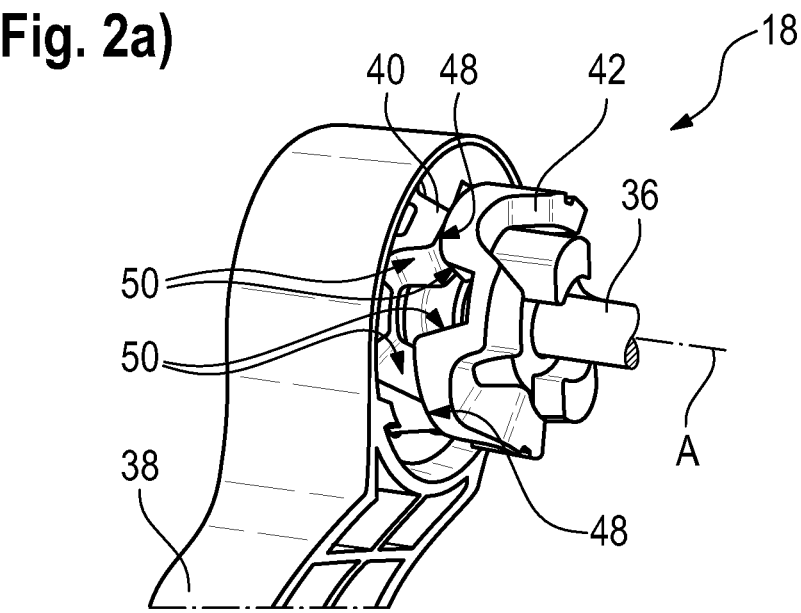
FIGS. 2a and 2b show a clamping device according to the invention in the adjusting device according to FIG. 1 in a perspective view, in the fixing position and the release position respectively.
Figure 2B:
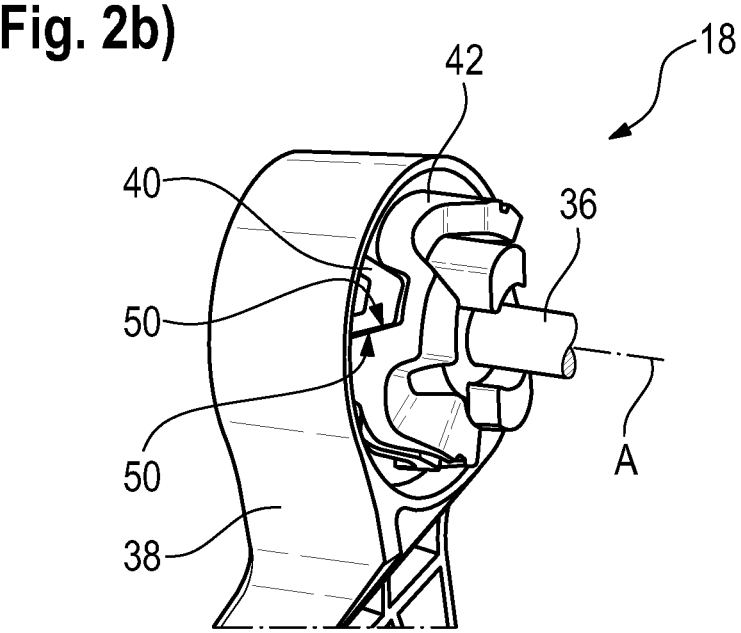

In FIGS. 2a and 2b, the clamping device 18 or, to be more precise, the actuating lever 38, the actuating component 40 and the mating component 42 are illustrated in more detail. For greater clarity, a cylindrical extension 46 (FIG. 3a) has not been illustrated. The geometry of the actuating component 40 and of the mating component 42 is readily visible in FIGS. 2a and 2b. The actuating component 40 is secured on the actuating lever 38 for conjoint rotation therewith and is rotatable relative to the axis of rotation A defined by the tie bolt 36. The mating component 42 is formed for conjoint rotation with the tie bolt 36 or is at least fixed in terms of rotation relative to the other components of the adjusting device 10, in particular the steering column housing 16. Both of the components 40, 42 have an annular outer contour, i.e. the components 40, 42 appear round in a view along the axis of rotation A.

On the mutually facing ends, the actuating component 40 and the mating component 42 each have alternating bearing surfaces 48 and ramp sections 50. The ramp sections 50 of the mating component 42 have a slope in the circumferential direction in the axial direction along the axis of rotation A, wherein adjacent ramp sections 50 have opposed slopes. In this way, V-shaped recesses are formed in the circumference from the end facing the actuating component 40.

The ramp sections 50 of the actuating component 40 are formed on the end facing the mating component 42 and are shaped in a manner complementary to the ramp sections 50 of the mating component 42. In other words, V-shaped projections, which have a shape complementary to the V-shaped recesses in the mating component 42, are formed on the end of the actuating component 40.

As can be seen when FIGS. 2a and 2b are compared, a rotation of the actuating component 40 relative to the mating component 42, e.g., when the actuating lever 38 is actuated, leads to the actuating component 40 being moved in the axial direction relative to the mating component 42. By means of this axial movement, the locking subassembly comprising the actuating component 40 and the mating component 42 expands in the axial direction, with the result that a force is exerted on the clamping jaws 22. In this situation, which is shown in FIG. 2a, the actuating component 40 and the mating component 42 rest against one another only by means of their bearing surfaces 48 on the ends. In the release position shown in FIG. 2b, in contrast, the ramp sections 50 rest against one another. The actuating component 40 and the mating component 42 engage in one another and the axial length of the locking subassembly is reduced.

Figure 3A:
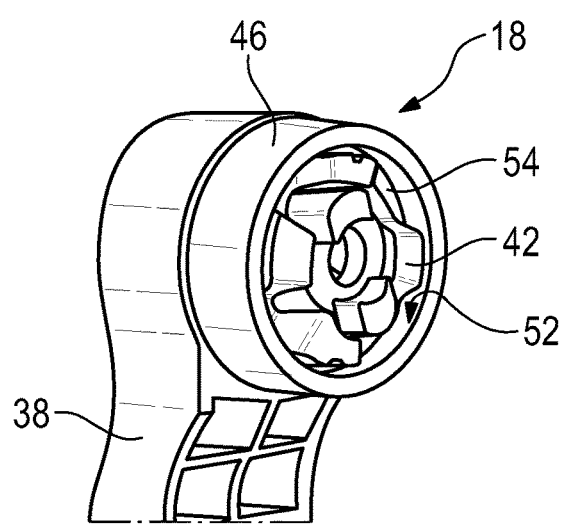
FIGS. 3a to 3c show the clamping device according to FIG. 2b in a perspective view, in a perspective section and schematically in a section, respectively.
Figure 3B:
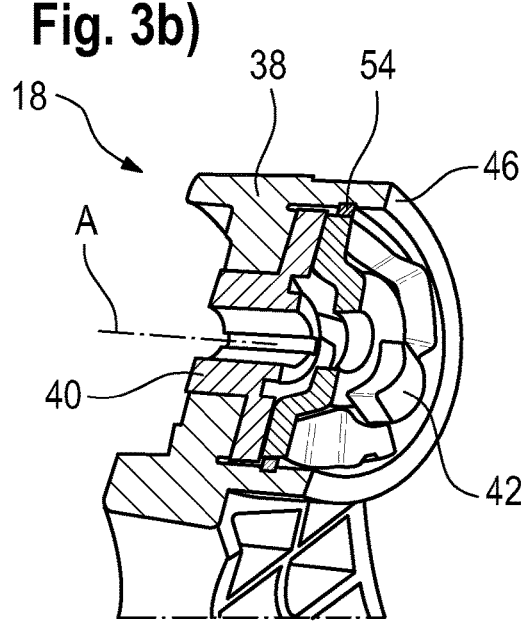
Figure 3C:
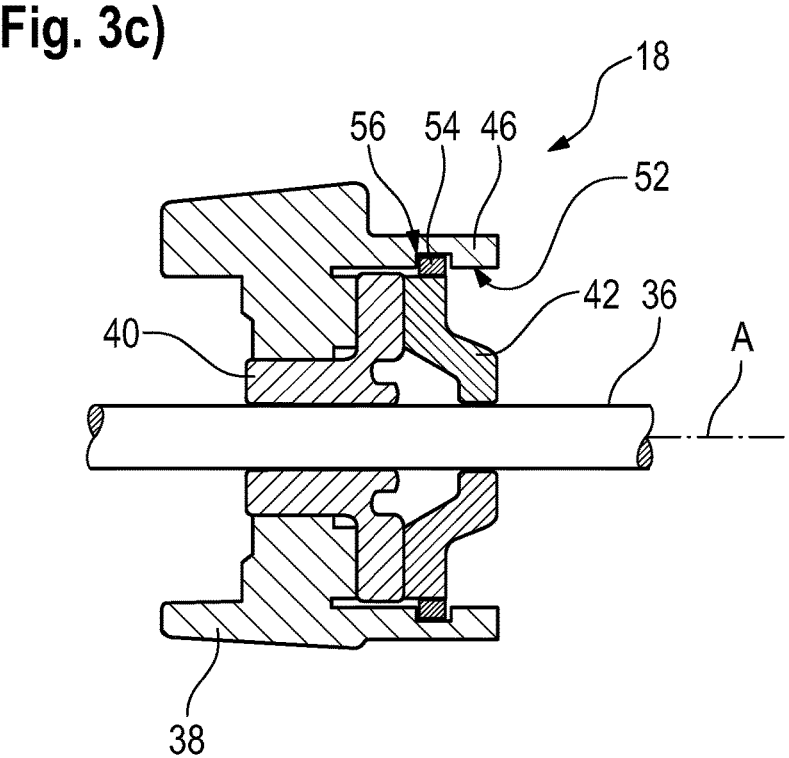

In FIGS. 3a to 3c, the actuating lever 38 is then illustrated with its cylindrical extension 46. In the illustrative embodiment shown, the cylindrical extension 46 is of circular-cylindrical and hollow design. The cylindrical extension 46 is concentric with the tie bolt 36 and hence with the axis of rotation A and extends from the actuating lever 38 in the direction of the mating component 42. As can be seen especially in FIG. 3a, the cylindrical extension 46 completely surrounds both the actuating component 40 and the mating component 42 in the circumferential direction. In the release position illustrated in FIG. 3, the cylindrical extension 46 also extends beyond the mating component 42 in the axial direction, and therefore the mating component 42 lies completely within the cylindrical extension 46.

A damping element 54 of the clamping device 18 is mounted on an inner wall 52 of the cylindrical extension. The damping element 54 is composed of a solid material, for example, that is to say it is a solid damping element 54 and, in the illustrative embodiment shown, is formed integrally. The damping element 54 is designed, for example, as a separate insert, e.g. as an O-ring, which is arranged in a recess 56 in the inner wall 52. It is also conceivable for the damping element 54 to be molded directly onto the actuating lever 38.

In the first illustrative embodiment shown, the damping element 54 is composed of a flexible material, in particular of rubber or a thermoplastic elastomer. In the axial direction, the damping element 54 is arranged in the region of the mating component 42, in particular when the clamping device 18 is in the release position. In the illustrative embodiment shown, the damping element 54 is provided in the region of the end face of the mating component 42 in the axial direction, and therefore the peripheral sections of the bearing surfaces 48 which form the end face are in contact with the damping element 54. To be clear, the damping element 54 rests against the peripheral sections of the mating component 42 which connect two V-shaped recesses to one another.

Of course, it is also conceivable for the damping element 54 to be arranged somewhat further away from the actuating component 40 in the axial direction, with the result that the damping element 54 is in contact with the peripheral sections of the bearing surfaces 48 which form the bottoms of the V-shaped recesses in the mating component 42. For example, the damping element 54 extends along the entire circumference of the inner wall 52, with the result that the damping element 54 runs all the way round the mating component 42.

If the clamping device is now moved out of its fixing position into its release position, then, as described above, the mating component 42 moves axially relative to the actuating component 40 and the actuating lever 38. At the latest toward the end of the movement, that is to say when the mating component 42 is engaging almost completely in the actuating component 40, but especially during the entire movement, the mating component 42 comes into contact with the damping element 54. The relative movement between the actuating component 40 and the mating component 42 is then damped by the damping element 54, with the result that the movement is not ended by an abrupt halt at an end stop. A particularly quiet movement is thereby achieved.

Figure 4:
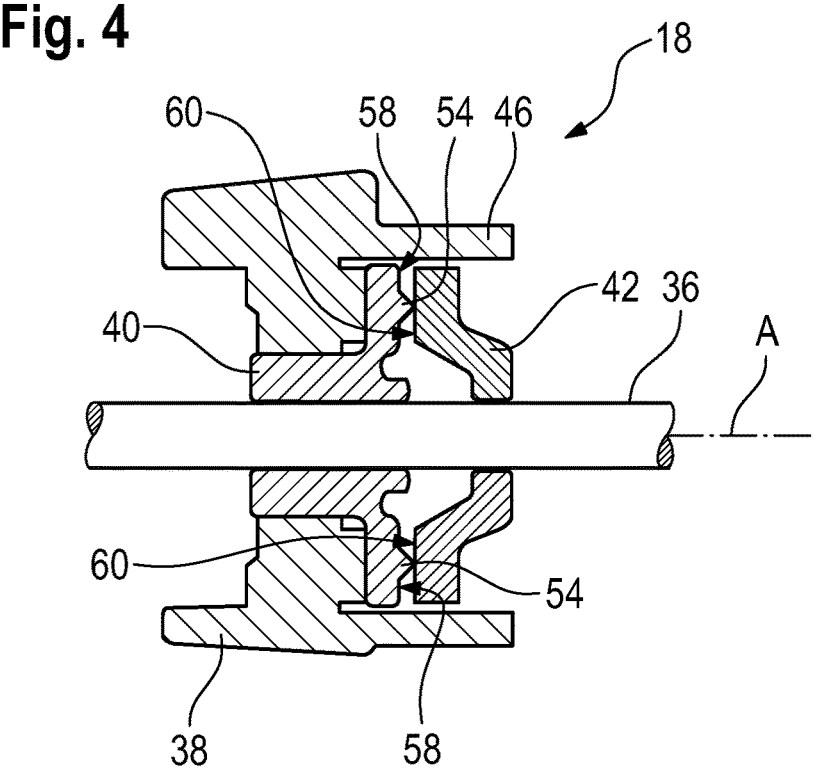
FIG. 4 shows a second embodiment of a clamping device according to the invention schematically in section.
Figure 5:
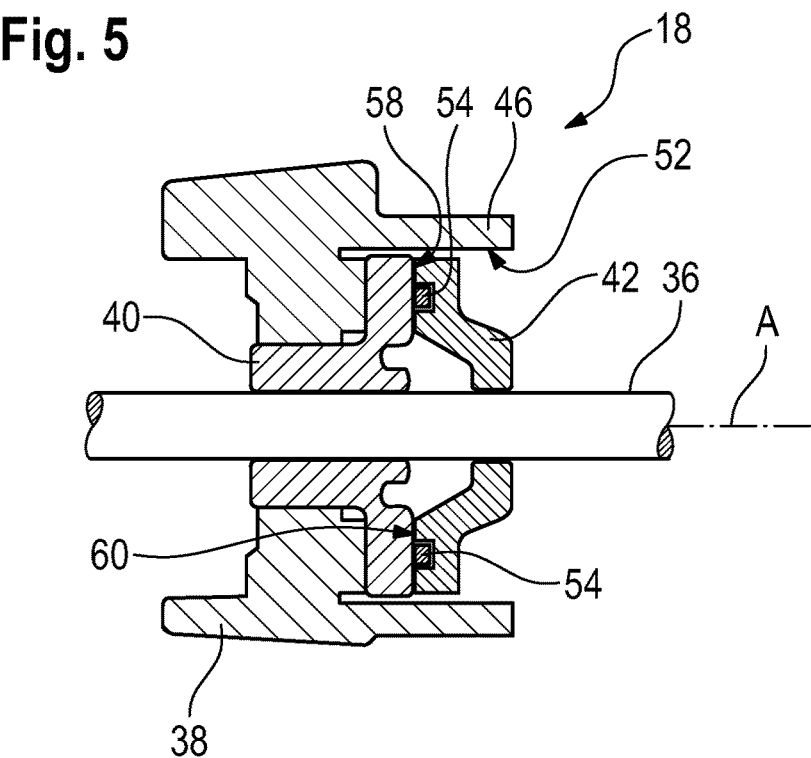
FIG. 5 shows a third embodiment of a clamping device according to the invention schematically in section.

Further embodiments of the clamping device according to the invention, which correspond substantially to the clamping device of the first embodiment, are illustrated in FIGS. 4 and 5. Only the differences are explored below, therefore, and identical and functionally identical parts are provided with the same reference signs. FIG. 4 shows a section similar to that in FIG. 3c through a clamping device 18 according to a second embodiment. In this embodiment, the actuating lever 38 is, on the one hand, formed integrally with the actuating component 40. Moreover, the damping element 54 is not provided on the cylindrical extension 46. It would also be possible to dispense with the cylindrical extension 46. In contrast, the damping element 54 is secured on the actuating component 40 itself. For this purpose, the actuating component 40 has a plurality of damping surfaces 58, which correspond to the bearing surfaces 48 on the end of the actuating component 40 or on the bottom of the recesses. The mating component 42 has opposing contact surfaces 60 for this purpose, which are opposite the damping surfaces 58, at least in the release position. Accordingly, the contact surfaces 60 are likewise the bearing surfaces 48 on the bottom of the recesses or on the end.

The ramp sections 50, in particular in each case two ramp sections 50, are situated between two adjacent damping surfaces 58 or contact surfaces 60. Both the damping surfaces 58 and the contact surfaces 60 are substantially perpendicular to the axis of rotation A. The damping element 54 is now provided in several parts and on the damping surfaces 58. In the illustrative embodiment shown, the damping elements 54 are connected integrally to the actuating component 40 and are designed as small projections. In this case, the damping elements 54 are composed of a hard material, e.g. a polymer or a metal. In particular, this is the material of the actuating component 40. In the release position, which is shown in FIG. 4, the contact surfaces 60 of the mating component 42 are in contact with the damping elements 54.

A third embodiment of the clamping device 18 is illustrated in FIG. 5. In this embodiment, the damping element 54 is secured on the mating component 42 and is in contact with the actuating component 40. Similar to the second embodiment, the mating component 42 now has the damping surfaces 58 and the actuating component 40 now has the contact surfaces 60. In this embodiment too, the damping element 54 can be formed integrally with the mating component 42 or, as in the first embodiment, can be provided as a separate insert. Of course, the features of the various embodiments can be combined with one another in any desired manner. Thus, for example, the integral embodiment of the actuating lever 38, the actuating component 40 and the cylindrical extension 46 can also be transferred to the other embodiments.

It is also conceivable for the damping element 54 to be arranged on the mating component 42 in the first embodiment. It is, of course, also possible for the cylindrical extension 46 to be embodied as a separate component, which is then connected to the actuating lever 38.

What is claimed is:

1. A clamping device for a longitudinally adjustable and/or vertically adjustable steering column of a vehicle, having
    an actuating lever, an actuating component, a tie bolt and a mating component,
    wherein the actuating component is attached to the actuating lever, and the mating component is attached to the tie bolt,
    wherein during a relative rotation between the actuating component and the mating component about an axis of rotation, the actuating component moves in an axial direction relative to the mating component between a release position and a fixing position,
    wherein a solid damping element is provided for damping the relative rotation between the actuating component and the mating component for an entirety of the relative rotation, and
    wherein one of the actuating component and the mating component has at least one damping surface on which the damping element is secured, and the other of the actuating component and the mating component has at least one contact surface with which the damping element is in contact, the damping and contact surfaces extending transverse to the axial direction.

2. The clamping device as claimed in claim 1, wherein the actuating component is secured on the actuating lever for conjoint rotation therewith, wherein the actuating component and the actuating lever are rotatable about an axis of rotation relative to the mating component and/or the tie bolt.

3. The clamping device as claimed in claim 1, wherein the damping element is integral.

4. The clamping device as claimed in claim 1, wherein the damping element is secured on the actuating component and is in contact with the mating component.

5. The clamping device as claimed in claim 1, wherein the damping element is secured on the mating component and is in contact with the actuating component.

6. The clamping device as claimed in claim 1, wherein the mating component and/or the actuating component have/has an annular outer contour, which is concentric with the tie bolt.

7. The clamping device as claimed in claim 1, wherein the actuating lever or the actuating component has a hollow-cylindrical extension having an inner wall, in which extension the mating component is at least partially accommodated.

8. The clamping device as claimed in claim 1, wherein the actuating component and the mating component each have at least one ramp section, which ramp sections are formed in a manner complementary to one another, wherein the actuating component and the mating component each have at least two bearing surfaces on their facing ends, wherein the ramp sections are provided between the bearing surfaces.

9. The clamping device as claimed in claim 8, wherein the ramp sections interact in such a way during the relative rotation of the actuating component and of the mating component about the axis of rotation that the actuating component moves in the axial direction relative to the mating component.

10. The clamping device as claimed in claim 9, wherein the damping element is a separate insert, or wherein the damping element is molded onto the actuating component or onto the mating component.

11. The clamping device as claimed in claim 1, wherein the damping element is composed of a flexible material, or wherein the damping element is composed of a hard material.

12. The clamping device as claimed in claim 1, wherein the damping element is formed integrally with the actuating component or the mating component.

13. The clamping device as claimed in claim 1, wherein the clamping device has a spring element, which preloads the mating component against the actuating component.

14. The clamping device as claimed in claim 1, wherein the clamping device has at least one clamping jaw, which is actuated by means of the tie bolt.

15. The clamping device as claimed in claim 1, wherein the damping element engages the contact surface in the axial direction when in the release position.

16. A clamping device for a longitudinally adjustable and/or vertically adjustable steering column of a vehicle, the clamping device comprising:
    a mating component attached to a tie bolt;
    an actuating component attached to an actuating lever, the actuating component being movable relative to the mating component between a release position and a fixing position,
    an extension in which the mating component is at least partially accommodated; and a solid damping element for damping a relative movement between the actuating component and the mating component, the damping element extending from one of an inner wall of the extension and an outer wall of the mating component toward the other of the inner wall of the extension and the outer wall of the mating component and engaging the other of the inner wall of the extension and the outer wall of the mating component.

17. The clamping device as claimed in claim 16, wherein the damping element is secured on the outer wall of the mating component and extends toward and engages the inner wall of the extension.

18. The clamping device as claimed in claim 16, wherein the damping element is secured on the inner wall of the extension and extends toward and engages the outer wall of the mating component.

19. The clamping device as claimed in claim 16, wherein
the extension extends from at least one of the actuating component and the actuating lever, or
the extension is formed as one-piece with at least one of the actuating component and the actuating lever.

20. The clamping device as claimed in claim 16, wherein the actuating component moves in an axial direction relative to the mating component between the release position and the fixing position, a gap extending transverse to the axial direction between the inner wall of the extension and an outer wall of the mating component, the damping element extending transverse to the axial direction through the gap from one of the inner wall of the extension and the outer wall of the mating component to the other of the inner wall of the extension and the outer wall of the mating component to engage both the inner wall of the extension and the outer wall of the mating component.

* * * * *